US012669405B2

(12) United States Patent
Siew et al.

(10) Patent No.: US 12,669,405 B2
(45) Date of Patent: Jun. 30, 2026

(54) METHOD AND SYSTEM FOR MEASUREMENT OF OPTICAL LOSS IN WAFER LEVEL TESTING VIA WAVELENGTH-ROUTE DIVISION

(71) Applicant: ADVANCED MICRO FOUNDRY PTE. LTD., Singapore (SG)

(72) Inventors: Shawn Yohanes Siew, Singapore (SG); Bo Li, Singapore (SG); Feng Gao, Singapore (SG); Xianshu Luo, Singapore (SG)

(73) Assignee: ADVANCED MICRO FOUNDRY PTE. LTD., Singapore (SG)

( * ) Notice: Subject to any disclaimer, the term of this patent is extended or adjusted under 35 U.S.C. 154(b) by 108 days.

(21) Appl. No.: 18/853,189

(22) PCT Filed: Apr. 21, 2022

(86) PCT No.: PCT/SG2022/050238
§ 371 (c)(1),
(2) Date: Oct. 1, 2024

(87) PCT Pub. No.: WO2023/204753
PCT Pub. Date: Oct. 26, 2023

(65) Prior Publication Data
US 2025/0244202 A1 Jul. 31, 2025

(51) Int. Cl.
*G01M 11/00* (2006.01)
(52) U.S. Cl.
CPC .................................. *G01M 11/335* (2013.01)

(58) Field of Classification Search
CPC ..... G01M 11/33; G01M 11/335; G01M 11/35
See application file for complete search history.

(56) References Cited

U.S. PATENT DOCUMENTS 7,586,608 B1 9/2009 Gunn, III et al.
2003/0095736 A1 5/2003 Kish, Jr. et al.
(Continued)

FOREIGN PATENT DOCUMENTS

CN 110988646 A 6/2022
JP 2004-309552 A 11/2004
(Continued)

OTHER PUBLICATIONS

Office Action dated Sep. 30, 2025, for corresponding Japanese Patent Application No. 2024-553222 (11 pages).
(Continued)

*Primary Examiner* — Hina F Ayub
(74) *Attorney, Agent, or Firm* — Bookoff McAndrews, PLLC

(57) ABSTRACT

Disclosed is a system of measurement for optical loss that includes the light source unit that is further provided to the first fiber port assembly. The first fiber port assembly is connected with the first grating coupler unit. The first grating coupler unit is connected with the splitter unit. The splitter unit diverts the light to the plurality of routes. The plurality of route is combined with the combiner module. The combiner module is connected with the second grating coupler unit. The second grating coupler unit is connected with the second fiber port assembly. The second fiber port assembly is connected with an optical power detector module.

9 Claims, 4 Drawing Sheets

(56)     References Cited

U.S. PATENT DOCUMENTS

| 2003/0095737 | A1 | 5/2003 | Welch et al. | |
| 2014/0185042 | A1 | 7/2014 | Baets et al. | |
| 2015/0211960 | A1 | 7/2015 | Shimizu | |
| 2018/0202895 | A1* | 7/2018 | Hayashi | G02B 6/02 |
| 2020/0232878 | A1 | 7/2020 | Ma et al. | |
| 2024/0272513 | A1* | 8/2024 | Liu | G02F 1/292 |

FOREIGN PATENT DOCUMENTS

| JP | 2014-179465 A | 9/2014 |
| JP | 2018-180332 A | 11/2018 |
| JP | 2020-140015 A | 9/2020 |

OTHER PUBLICATIONS

Written Opinion of the International Searching Authority Authority issued on Jul. 13, 2022, in counterpart International Patent Application No. PCT/SG2022/050238 (5 pages, in English).

International Preliminary Report on Patentability issued on May 10, 2023 in counterpart International Patent Application No. PCT/SG2022/050238 (6 pages, in English).

International Search Report issued on Jul. 13, 2022, in counterpart International Patent Application No. PCT/SG2022/050238 (5 pages, in English).

* cited by examiner

METHOD AND SYSTEM FOR MEASUREMENT OF OPTICAL LOSS IN WAFER LEVEL TESTING VIA WAVELENGTH-ROUTE DIVISION

CROSS-REFERENCE TO RELATED APPLICATION(S)

This is a National Stage Application under 35 U.S.C. § 371 of International Application No. PCT/US2022/050238, filed Apr. 21, 2022, the entireties of which are incorporated herein by reference.

FIELD OF THE INVENTION

The present invention relates to a field of silicon photonics and optical loss measurement and more particularly to a method and system for measurement of optical loss in wafer level testing via wavelength-route division.

BACKGROUND OF THE INVENTION

Wafer-level loss measurement systems typically use a laser source, a power detector, and two optical fibers. Light is coupled into a photonic circuit on a wafer by using a vertically coupled grating coupler. Routes of different length are used, and the output power varies depending on the length of the route. This allows the optical loss per unit length to be measured.

Current loss measurement systems have a lot of variability in terms of the measured loss. The main variability is due to the grating coupling efficiency: vertical coupling of light is required for wafer level testing setups, but the coupling efficiency depends on the optimization and approach of the fiber array to the wafer. Sometimes, this can be a 6-axis (x, y, z, θx, θy, θz) optimization with low tolerances. If the coupling efficiency is not exactly matched, this will cause the loss measurement to be inaccurate.

Therefore, there remains a need to provide a system that provides high accuracy in optical loss measurement and a method to determine the optical loss in wafer level testing via wavelengths route division.

SUMMARY OF THE INVENTION

In view of the foregoing, a system for measurement of optical loss in wafer level testing via wavelength route division is provided.

In an aspect, the system includes a light source unit that is connected with a first fiber port assembly to provide an input light wavelength, a first grating coupler unit connected with the first fiber port assembly to couple a respective fiber array (FA), a splitter unit connected with the first grating coupler unit to divert the input light wavelength to a plurality of routes, a combiner module connected with the plurality of route to combine light wavelengths and a second grating coupler unit connected with the combiner module to couple output fiber array, an optical power detector module connected with a second fiber port assembly to collect an output spectrum.

In another aspect the light source unit is a tuneable light source (TLS) and coupled vertically to a silicon photonics wafer.

In another aspect, the second grating coupler unit may be connected with the second fiber port assembly.

In another aspect, the first fiber port assembly collects and couple a vertical light with a multiple port fibre array (FA).

In another aspect, the first grating coupler unit may be coupled to the respective fiber array.

In another aspect, splitter unit utilizes a 1:N splitter to split the light into different lengths in the plurality of routes. The value of N can be larger than 2.

In another aspect, wavelengths (lights) are travelled and traversed in the plurality of routes and their wavelengths are combined via the combiner module.

In another aspect, a detected power at the second fiber port assembly is calculated via the difference of several variables for instance the output coupling, variable loss, system loss, input coupling and detected power.

In another aspect, a method for measuring optical loss in wafer level testing via wavelength route division is disclosed. The method comprises providing an input light wavelength, diverting the input light wavelength into a plurality of routes, and combining the input light wavelength with one or more other input light wavelengths. Further, the method comprises collecting an output spectrum in response to combining the input wavelength.

BRIEF DESCRIPTION OF THE DRAWINGS

Other objects, features, and advantages of the embodiment will be apparent from the following description when read with reference to the accompanying drawings. In the drawings, wherein like reference numerals denote corresponding parts throughout the several views.

The diagrams are for illustration only, which thus is not a limitation of the present disclosure, and wherein.

To facilitate understanding, like reference numerals have been used, where possible to designate like elements common to the figures.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Throughout the prior art, there remains a need of providing a method and system that provides high accuracy in optical loss measurement in wafer level testing via wavelengths-route division.

In addressing the identified problems of conventional technologies, the present disclosure provides a method and system of measuring loss in a wafer level testing setup, using vertically coupled light. In particular, the method and system disclosed herein can divide light into separate "routes", based on any property such as wavelength, polarization, or modal properties of the light. Consequently, the light can only be coupled into once, and sub-divided by its property. The light can pass through said "routes" of different length and interfere at the output. The output power can be measured against wavelength, polarization, or mode to determine and calculate the optical loss. This removes the issue of coupling efficiency errors. Essentially, the method and system disclosed herein can compare the ratio of powers so that the coupling efficiency is de-embedded. The equation for calculating optical loss is stated in a subsequent paragraph.

Accordingly, in one embodiment, there is provided a method and system for measurement of optical loss in wafer level testing via wavelength route division, whereby light can be split by one of its property (wavelength, polarization, mode, etc) into separate paths or "routes", and the subsequent ratio of powers may be compared, to measure the optical loss. This can advantageously remove inaccuracies in the coupling efficiency.

In one embodiment, the method and system disclosed herein comprises one coupling structure with light being divided into different 'routes'. Thus, the coupling efficiency is the same for each path. This could remove the inaccuracies in the coupling efficiency. In another embodiment, the method and system disclosed herein comprises at least 3 coupling structures separately. Thus the coupling efficiency in separated 'routes' is different. So it could remove the inaccuracies in the coupling efficiency.

Figure 1:
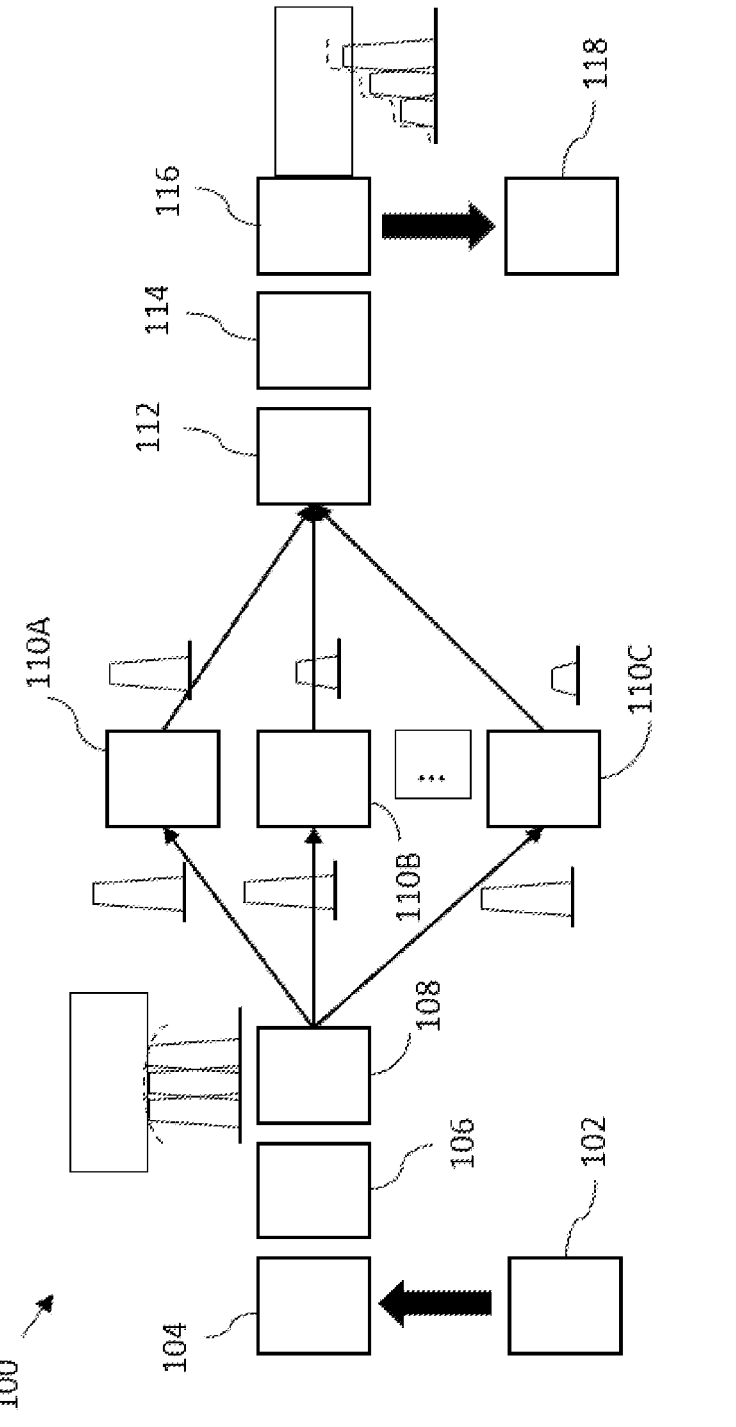
FIG. 1 illustrates a block diagram of a system 100 of measurement for optical loss, according to an embodiment herein.

Referring to FIG. 1, a block diagram of a system 100 of measurement for optical loss in accordance with the embodiment of the present invention is provided. The system 100 of measurement for optical loss includes a light source unit 102, a first fiber port assembly 104, a first grating coupler unit 106, a splitter unit 108, a plurality of routes 110, a combiner module 112, a second grating coupler unit 114, a second fiber port assembly 116 and an optical power detector module 118.

The light source unit 102 may be a laser, a superluminescent diode, or other light emitting device. In another example, the light unit 102 may be for example, a red or green laser diode. The light source unit 102 may be used to emit an electromagnetic radiation in the first fiber port assembly 104. In an embodiment, the light source unit 102 is a tuneable light source (TLS).

Each of the first fiber port assembly 104 and the second fiber port assembly 116 may comprise an optical fiber, a reinforcement strand for support, and fiber optic cable connectors. The fiber port assemblies can be made of one of single-mode fibers. The single mode fibers are made of a single strand of glass fiber and ranges between 8.3 and 10 microns in diameter. The single mode fibers has only one mode of transmission in which light moves down the cable in a single direction and have a high bandwidth. The first grating coupler unit 106 and the second grating coupler unit 114, in an example, are integrated-optic components formed by a refractive index modulation. The refractive index modulation may be performed in a thin layer on a waveguide for coupling a guided wave. The first grating coupler unit 106 and the second grating coupler unit 114 provide output or input coupling of a guided wave. In addition, the first grating coupler unit 106 and the second grating coupler unit 114 may provide functions, such as focusing of light, polarization splitting, switching, and guided-mode selection. In an example, the grating coupler unit 106 and the second grating coupler unit 114 can be placed anywhere on a chip, allowing simple wafer scale testing and providing much wider alignment tolerance. The splitter unit 108 may be an integrated waveguide optical power distribution device that can split an incident light beam into two or more light beams. The combiner module 112 can be used for combining multiple laser or light signals from multiple different paths into a single fiber.

The optical power detector module 118 can be a device used to measure an output power of an optical signal or average power in fiber optic systems. In an example, the optical power detector module 118 may comprise a calibrated sensor, a measuring amplifier and a display. The calibrated sensor may comprise a photodiode selected for an appropriate range of wavelengths and power levels. On the display, the measured optical power and set wavelengths are displayed.

In one embodiment, the light source unit 102 may be optically coupled to the first fiber port assembly 104. The first fiber port assembly 104 may be connected with the first grating coupler unit 106, and the first grating coupler unit 106 may be connected with the splitter unit 108. The splitter unit 108 diverts the light to the plurality of routes 110 (110A, 110B . . . 110C). In one embodiment, the plurality of routes 110 may have different lengths. The plurality of routes 110 can be connected with the combiner module 112. The combiner module 112 is connected with the second grating coupler unit 114. The second grating coupler unit 114 is connected with the second fiber port assembly 116. The second fiber port assembly 116 is connected with an optical power detector module 118. The first fiber port assembly 104 may collect and couple the vertical light from the light source unit 102 with a multiple port fiber array. The first grating coupler unit 106 couples the respective fiber array. The optical loss may be measured by comparing the output power with one or more of wavelength, polarization, or mode of the light. The light source unit 102 and fiber port assembly 104 can be connected by fiber. In continuation, the fiber port assembly 116 and optical power detector module 118 can be connected by fiber. Furthermore, there is no connection between the first fiber port assembly 104, second fiber port assembly 116 and first grating coupler 106 and second grating coupler 114. The light coupled from 104 to 106 in free space is called "coupling efficiency".

The grating coupler 106, splitter unit 108, combiner module 112, grating coupler 114 can be fabricated on the same chip which is connected by optical waveguide.

Regarding the plurality of routes, the number of routes can be greater than 2. The light source unit 102 provide optical light with different wavelength and go to fiber port assembly 104. In free space coupling, optical light is coupled into grating coupler 106 and then it transports in optical waveguide. After the splitter unit 108, light will split into different paths due to different wavelength. When light arrives at the combiner module 112, it will combine and propagate in the same optical waveguide. Thus, it is coupled into fiber port assembly 116 and detected by optical power detector module 118.

Referring to FIG. 1, the splitter unit 108 is connected with the first grating coupler unit 106. In an embodiment, the 1:N splitter is utilized to split the light into different lengths in the plurality of route 110 (110A, 110B . . . 110C). In another embodiment, the splitter unit 108 is wavelength-based. The splitter unit 108 may use other systems including but not limited to one of a polarization mode and a propagation mode. The wavelengths (lights) are travelled and traversed in the plurality of route 110 (110A, 110B . . . 110C). Thereafter, the lights are combined via the combiner module 112. In an embodiment, each wavelength travels in different lengths. The wavelengths undergo with different amount of loss al. In another embodiment, the relative difference between each wavelength level then determines the loss per unit length. The second grating coupler unit 114 may be connected with the second fiber port assembly 116. In an aspect, the second grating coupler unit 114 may separately measure and calibrate the light wavelengths. In an embodiment, the lengths are defined in the plurality of route 110 (110A, 110B . . . 110C). In an embodiment, the channels may be spaced together and configured in another structure with the reverse lengths. Such a configuration provides benefits of characterizing loss against wavelength.

In another embodiment, the detected power is calculated via the difference of several variables for instance the output coupling, variable loss, system loss, input coupling and detected power. The output spectrum is thus obtained from the second fiber port assembly 116 that is further connected with an optical power detector module 118.

In another embodiment, the wavelengths that are partially split are coupled to estimate the propagation loss.

In an embodiment, the system 100 is not affected from the coupling efficiency error because the ratio of powers is compared to de-embed and measure optical loss.

Figure 4:
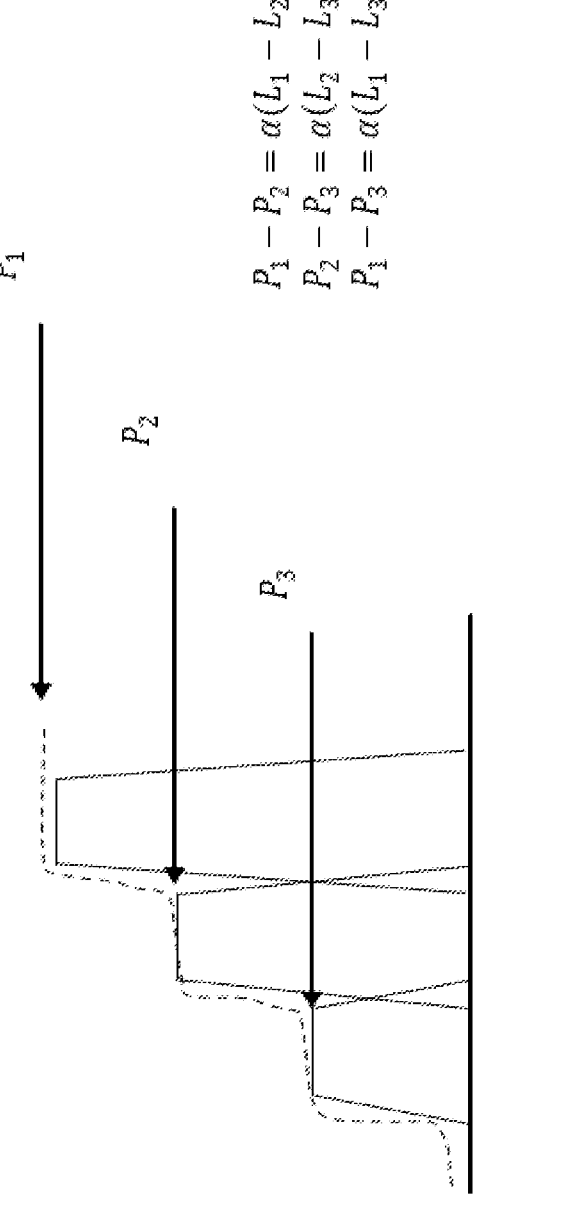
FIG. 4 illustrates the output spectrum from the system disclosed herein and equations for calculating optical loss.

In an example, the lengths of different routes 110 are known. Equations (1), (2), and (3) may be used to obtain the result, as shown in FIG. 4. The equation is given as:

$$P_1 - P_2 = \alpha (L_1 - L_2) \qquad (1)$$

$$P_2 - P_3 = \alpha (L_2 - L_3) \qquad (2)$$

$$P_1 - P_3 = \alpha (L_1 - L_3) \qquad (3)$$

where, $P_1$, $P_2$, and $P_3$ denote power levels;
$L_1$, $L_2$ and $L_3$ denote lengths of each route; and
$\alpha$ denotes absorption coefficient, and $\alpha$ is same for the routes 110A, 110B, and 110C.
Another equation (4) may be used:

$$P_n = P_{in} - G_{in} - Sys - \alpha L_n - G_{out} \qquad (4)$$

where, $P_n$ denotes detected power;
$P_{in}$ denotes input power;
$G_{in}$ denotes input coupling;
Sys denotes system loss;
$\alpha L_n$ denotes variable loss; and
$G_{out}$ denotes output coupling.
If there is wavelength independent loss, these equations could be applied to measure the optical loss as below:
For example:
1. Splitter unit 108 splits 3 routes 110 with different wavelength range (1500 nm-1510 nm, 1510 nm-1520 nm, 1520 nm-1530 nm).
2. Router 1—light with the wavelength (1500 nm-1510 nm) propagate on length L1.
   Router 2—light with the wavelength (1510 nm-1520 nm) propagate on length L2.
   Router 3—light with the wavelength (1520 nm-1530 nm) propagate on length L3.
3. After combiner module 112, the light is combined. The output spectrum is monitored and different wavelength range have different power, such as
   a. At wavelength (1500 nm-1510 nm), the power is P1 b. At wavelength (1510 nm-1520 nm), the power is P2.
   c. At wavelength (152 nm-1530 nm), the power is P3.
4. After measurement data is collected for different power levels (P1 P2 P3), the loss is calculated based on equations (1-3).

In another embodiment, if there is a large wavelength dependent loss, these channels can be placed together. The difference in power may be calculated based on equations (5), (6) and (7). These channels are related to different routes 110 with different wavelength after the splitter unit 108.

$$P_1 - P_2 = \alpha_1 L_1 - \alpha_2 L_2 \qquad (5)$$

$$P_2 - P_3 = \alpha_2 L_2 - \alpha_3 L_3 \qquad (6)$$

$$P_1 - P_3 = \alpha_1 L_1 - \alpha_3 L_3 \qquad (7)$$

where:
P1. the power in 110A
P2: the power in 110C
L1: optical waveguide length in 110A
L2: optical waveguide length in 110B
L3: optical waveguide length in 110C
$\alpha 1$: absorption coefficient in 110A at wavelength A
$\alpha 2$: absorption coefficient in 110B at wavelength B
$\alpha 3$: absorption coefficient in 110C at wavelength C
In another embodiment, the channels can be provided with another structure with the reverse lengths as mentioned herein The power difference may be calculated based on the equations (8), (9) and (10):

$$P_1 - P_2 = \alpha_1 L_3 - \alpha_2 L_2 \qquad (8)$$

$$P_2 - P_3 = \alpha_2 L_2 - \alpha_3 L_1 \qquad (9)$$

$$P_1 - P_3 = \alpha_1 L_3 - \alpha_3 L_1 \qquad (10)$$

In the embodiment, a is different for 110A, 110B, and 110C in the equations 8-10.
$\alpha 1$: absorption coefficient in 110A at wavelength A
$\alpha 2$: absorption coefficient in 110B at wavelength B
$\alpha 3$: absorption coefficient in 110C at wavelength C
In another embodiment, these coupling structures can be grating or edge coupled. For 2-port designs, directional couplers can be used. The case for 2 wavelengths can be simulated, for showing the working of the 2-port designs. For the wavelengths which are partially split, fitting can be performed to also estimate the propagation loss.

For Multi-port design, Arrayed Waveguide Grating (AWG) or Mach Zehnder Interferometers (MZI) structures may be used. These structures can split the wavelength into as many channels as required and can have flat tops. Multiple wavelength channels allow multiple path lengths to be measured with a single transmission spectrum (wavelength sweep). Multiple test structures can be formed as a system of linear equations to solve the wavelength-dependent loss. Since all devices are coupled once, the coupling efficiency remains the same, and can be de-embedded from the measurement.

In an embodiment, the system 100 removes the variabilities associated with vertical light coupling for wafer level optical testing. Here, there is only 1 coupling structure and then light is divided into different "routes". So the coupling efficiency is the same for each path. Thus it could remove the inaccuracies. Similarly, there can be at least 3 coupling structures separately. Thus the coupling efficiency in separated 'routes' is different. So it could remove the inaccuracies in the coupling efficiency.

Figure 2:
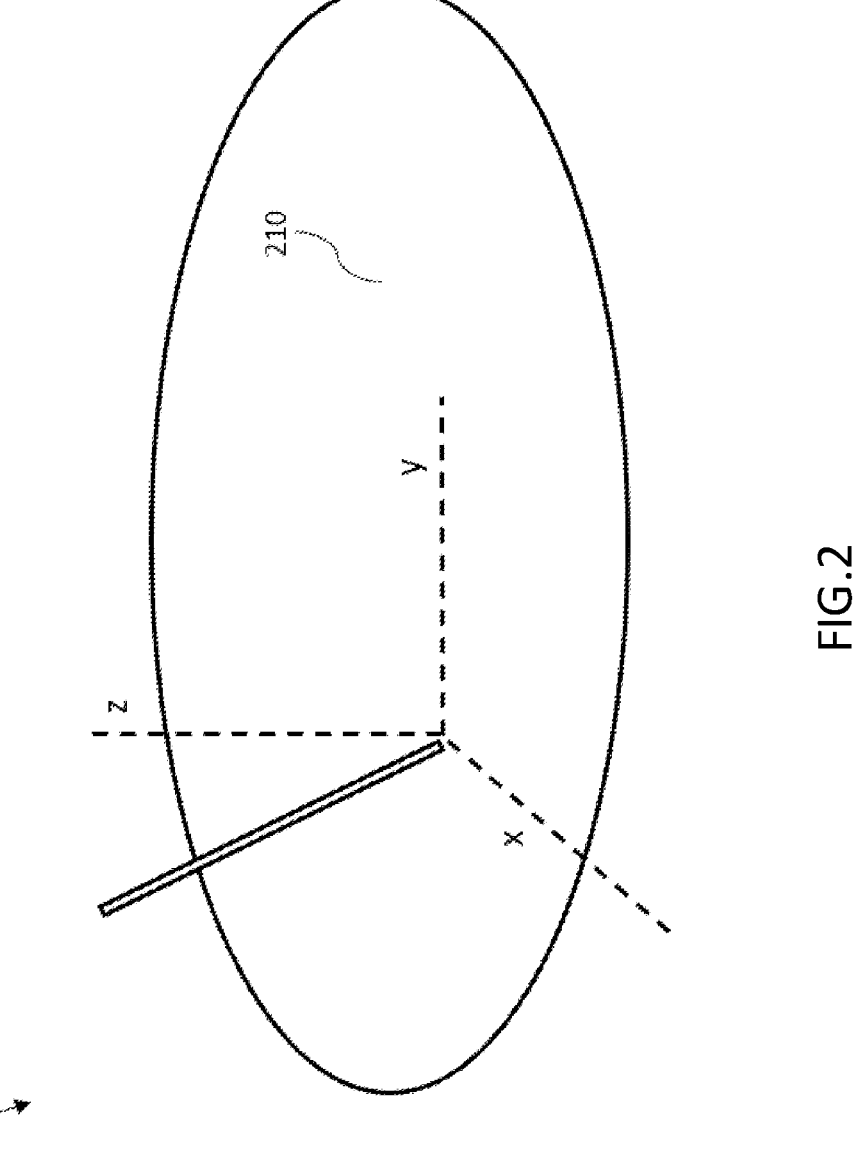
FIG. 2 illustrates a schematic view of silicon photonics 200 according to an embodiment herein.

Referring to FIG. 2 illustrates a schematic view of silicon photonics 200 in accordance with an embodiment of the present invention is disclosed. FIG. 2 describes that a fiber array couples light into grating coupler structures vertically. In one embodiment, the silicon photonics 200 includes a silicon wafer 210. The fiber array is put above the grating coupler structures on the wafer 210. To achieve the best coupling efficiency, the fiber is adjusted along X, Y, Z axis.

The silicon photonics includes a silicon wafer 210 in which various coordinates (x, y, z) are labelled. Vertical light coupling may be performed using a fiber array having two or more ports, such as the first fiber port assembly 104, which may couple to their respective grating couplers. The Fiber array may be aligned in the spatial XYZ direction. In an example, the fiber array may require Ox, the angle of the fiber array, i.e., the relative height of each fiber array port, and Oz that denotes an in-plane alignment of the fiber array x-axis.

In another aspect, the angles may be fixed and non-uniformity in the wafer 210 setup means that each position will have different angles. In yet another aspect, the above-mentioned scenario may be resolved by creating different routes 110 mentioned herein.

Figure 3:
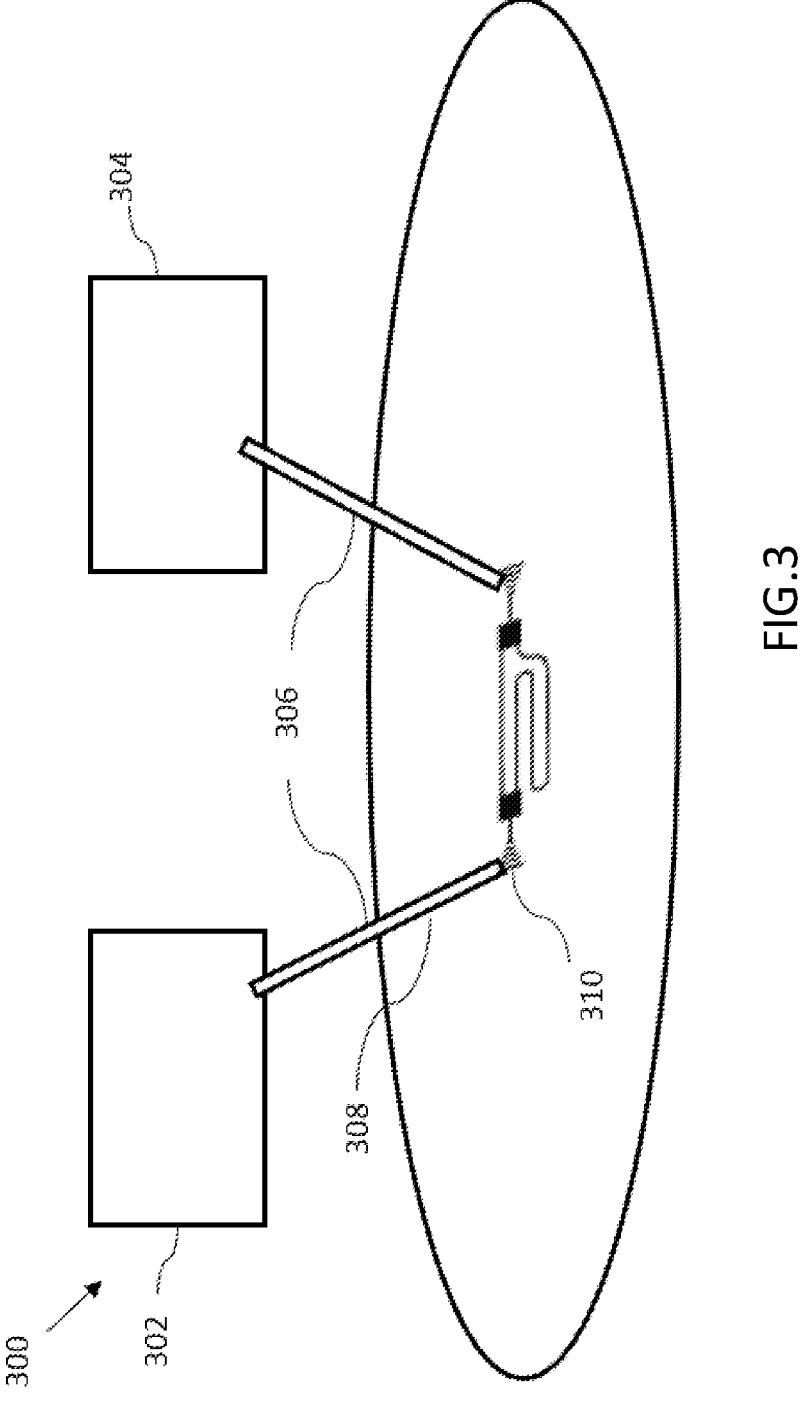
FIG. 3 illustrates another block diagram for splitting of wavelength of light, according to an embodiment herein.

FIG. 3 illustrates a system 300 comprising a tuneable light source, such as a tuneable laser source 302, an optical spectrum analyzer 304, optical fibers 306, grating couplers 308 and a wavelength splitter 310. In an embodiment, single device can be measured, where different lengths are measured all at once. The light is split into different routes, depending upon the wavelength. Each of these routes has a known distance. For instance, a wavelength 1 has distance x, a wavelength 2 has distance 2x and a wavelength 3 has distance 3x, where x is 10 mm distance for each route.

In an embodiment, a method for measuring the optical loss is disclosed. The optical loss may be measured in wafer level testing via wavelength route division. The method comprises providing an input light wavelength by tunable laser source, diverting the input light wavelength into a plurality of routes by AWG or MZI Demux design, and combining the input light wavelength with one or more other input light wavelengths. Further, the method comprises collecting an output spectrum in response to combining the input wavelength by photodetector. The essential steps of the method is wavelength-based splitter design which splits the light into different lengths and the calculation methods.

The method removes the variabilities associated with vertical light coupling for wafer level optical testing in accordance with an embodiment. The vertical light coupling may be performed with a two or more port fiber array, which couples to their respective grating couplers mentioned herein.

As will be readily apparent to those skilled in the art, the present embodiment may easily be produced in other specific forms without departing from its essential characteristics. The present embodiments are therefore, to be considered as merely illustrative and not restrictive, the scope being indicated by the claims rather than the foregoing description, and all changes which come within therefore intended to be embraced therein.

We claim:

1. A system for measurement of optical loss in wafer level testing via wavelength route division, comprising:
   a light source unit connected with a first fiber port assembly to provide an input light;
   a first grating coupler unit connected with the first fiber port assembly to couple a respective fiber array;
   a splitter unit connected with the first grating coupler unit to divert the input light to a plurality of routes;
   a combiner module connected with the plurality of routes to combine the light, wherein the routes between the splitter unit and the combiner module are of different lengths;
   a second grating coupler unit connected with the combiner module to couple an output fiber array; and
   an optical power detector module connected with a second fiber port assembly to collect an output spectrum, wherein the optical power detector module calculates a detected power based in part on the different lengths of the routes.

2. The system as claimed in claim 1, wherein the light source unit is a tuneable light source that is further coupled vertically to a silicon photonics wafer.

3. The system as claimed in claim 1, wherein the second grating coupler unit is connected with the second fiber port assembly.

4. The system as claimed in claim 1, wherein the respective fiber array is a multiple port fiber array.

5. The system as claimed in claim 1, wherein the first grating coupler unit and the second grating coupler unit each have a waveguide with a corresponding thin layer having a modulated refractive index.

6. The system as claimed in claim 1, wherein the splitter unit uses 1:N splitter to split the light into the plurality of routes having different lengths.

7. The system as claimed in claim 1, wherein the light is subdivided along each route by one of a wavelength, a polarization and a mode.

8. The system as claimed in claim 1, wherein a detected power at the second fiber port assembly is calculated via a difference of several variables comprising the output coupling, variable loss, system loss, input coupling and detected power.

9. A method for measuring optical loss in wafer level testing via wavelength route division, the method comprising:
   providing an input light;
   diverting the input light into a plurality of routes;
   combining the input light with one or more other input light wavelengths;
   wherein the plurality of routes extends between a splitter unit and a combiner module, and the plurality of routes each has a length different from one another; and
   collecting an output spectrum in response to combining the input light, wherein a relative difference between a wavelength of light in each of the plurality of routes is used to determine a loss per unit length or each of the plurality of routes.

\* \* \* \* \*